(12) United States Patent
Miyoshi

(10) Patent No.: US 6,915,195 B2
(45) Date of Patent: Jul. 5, 2005

(54) AIRBAG SYSTEM COLLISION HISTORY RECORDING METHOD

(75) Inventor: Kentaro Miyoshi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 168 days.

(21) Appl. No.: 10/369,516

(22) Filed: Feb. 21, 2003

(65) Prior Publication Data

US 2003/0168839 A1 Sep. 11, 2003

(30) Foreign Application Priority Data

Mar. 11, 2002 (JP) ........................ 2002-065650

(51) Int. Cl.⁷ .......................... G06F 19/00; B60R 21/32
(52) U.S. Cl. .......................... 701/45; 701/35; 280/735; 180/282
(58) Field of Search .................. 701/45–47, 29, 701/35; 340/438, 439; 280/735; 180/282

(56) References Cited

U.S. PATENT DOCUMENTS

| | | | | |
|---|---|---|---|---|
| 4,638,289 A | * | 1/1987 | Zottnik | 246/45 |
| 5,446,659 A | * | 8/1995 | Yamawaki | 701/29 |
| 6,067,488 A | * | 5/2000 | Tano | 701/35 |
| 6,185,490 B1 | * | 2/2001 | Ferguson | 701/35 |
| 6,246,933 B1 | * | 6/2001 | Bague | 701/35 |
| 6,298,290 B1 | * | 10/2001 | Abe et al. | 701/35 |
| 6,389,340 B1 | * | 5/2002 | Rayner | 701/35 |
| 6,405,112 B1 | * | 6/2002 | Rayner | 701/35 |
| 6,449,540 B1 | * | 9/2002 | Rayner | 701/35 |
| 6,636,791 B2 | * | 10/2003 | Okada | 701/35 |
| 6,741,168 B2 | * | 5/2004 | Webb et al. | 340/436 |
| 6,746,043 B2 | * | 6/2004 | Ishida | 280/735 |
| 2002/0091474 A1 | * | 7/2002 | Okada | 701/35 |

FOREIGN PATENT DOCUMENTS

| | | |
|---|---|---|
| JP | B 2875515 | 7/1997 |
| JP | A 9-183360 | 7/1997 |

* cited by examiner

*Primary Examiner*—Gary Chin
(74) *Attorney, Agent, or Firm*—Sughrue Mion, PLLC

(57) ABSTRACT

Acceleration data on acceleration that a vehicle undergoes are written in a readable memory, the acceleration being detected by an acceleration sensor. When an airbag is inflated, the time of the inflation is determined. Either acceleration data on acceleration that the vehicle undergoes during a predetermined time period before or after the determined time or acceleration data on acceleration that the vehicle undergoes during two predetermined time periods before and after the determined time are read from the readable memory, and the acceleration data read from the memory are stored in a nonvolatile memory as a collision history.

12 Claims, 8 Drawing Sheets

AIRBAG SYSTEM COLLISION HISTORY RECORDING METHOD

BACKGROUND OF THE INVENTION

1. Field of the Invention

The present invention relates to an airbag system collision history recording method of recording acceleration data on acceleration that a vehicle undergoes when the vehicle is involved in a collision in a nonvolatile memory as a collision history for an airbag system that detects the collision by using an acceleration sensor in order to secure a crew's safety.

2. Description of Related Art

FIG. 11 shows a prior art recording device intended for airbag systems, which is disclosed in Japanese patent No. 2875515, for example. In the figure, reference numeral 1 denotes a microcomputer disposed as a control unit, reference numeral 2 denotes an airbag ignition circuit that works from a signal from the microcomputer 1, reference numeral 3 denotes an acceleration sensor that detects a collision of a vehicle and sends a signal indicating the collision to the microcomputer 1, reference numeral 4 denotes a RAM connected to the microcomputer 1, and reference numeral 5 denotes a nonvolatile memory connected to the microcomputer 1.

In the prior art recording device untended for airbag systems that is constructed as previously mentioned, acceleration data on acceleration that the vehicle undergoes, which is detected by the acceleration sensor 3, are stored in the RAM 4 by way of the microcomputer 1 while the vehicle is traveling. When the RAM 4 is filled with acceleration data, old acceleration data are replaced by new acceleration data one after another. When the vehicle is involved in a collision, the recording device writes and stores all the acceleration data stored in the RAM 4 in the nonvolatile memory 5 in chronological order by way of the microcomputer 1 so that all the acceleration data can be used for analysis of the collision.

FIG. 12 is a graph showing acceleration data that are stored in the volatile memory by the prior art airbag system of FIG. 11. When a collision occurs, assuming that the airbag is inflated at a certain time tx, the prior art recording device writes and stores all acceleration data stored in the RAM 4, i.e., acceleration data on acceleration that the vehicle undergoes during the interval between the time t0 and the time tx in the nonvolatile memory 5 in chronological order (t0→tx).

As previously mentioned, in accordance with the prior art collision history storing method, at the occurrence of a collision the acceleration data stored in the RAM 4 are written into the nonvolatile memory 5 in chronological order. Therefore the prior art collision history storing method has the following problems. In general, the nonvolatile memory is a low-speed memory, and it takes much time to store data in the nonvolatile memory as compared with the time required for the microcomputer to perform processing and the duration of the occurrence of a collision. Therefore, when a failure, such as a decrease in the power supply voltage, occurs due to a break or the like caused by an impact on the airbag system at the occurrence of a collision while the microcomputer 1 is storing data in the nonvolatile memory 5, the process of storing data in the nonvolatile memory 5 is interrupted. In the example of FIG. 12, when a failure, such as a break in the airbag system, occurs at a time tα and the storing process is interrupted by the occurrence of the failure, no acceleration data on acceleration that the vehicle undergoes after that is stored in the nonvolatile memory 5 and only acceleration data on acceleration that the vehicle undergoes a time period D from the inflation time tx when the airbag is inflated to the time tα are written in the nonvolatile memory 5. However, in order to analyze the collision phenomenon that causes the inflation of the airbag, acceleration data on acceleration that the vehicle undergoes during a time period before and after the inflation time tx when the airbag is inflated, the acceleration data showing a strong correlation with the inflation of the airbag, are useful for the analysis of the collision, and the acceleration data on the time period D that are old acceleration data show a weak correlation with the inflation of the airbag.

SUMMARY OF THE INVENTION

The present invention is proposed to solve the above-mentioned problems, and it is therefore an object of the present invention to provide an airbag system collision history recording method of producing historic record of acceleration that a vehicle undergoes when the vehicle is involved in a collision, the method making it possible to record acceleration data showing a strong correlation with the inflation of an airbag.

In accordance with an aspect of the present invention, there is provided an airbag system collision history recording method of producing historic record of acceleration that a vehicle undergoes when the vehicle is involved in a collision, the method including the steps of writing acceleration data in a readable memory, determining a time when an airbag is inflated, reading either acceleration data on acceleration that the vehicle undergoes during a predetermined time period before or after the determined time or acceleration data on acceleration that the vehicle undergoes during two predetermined time periods before and after the determined time from the readable memory, and storing the acceleration data read from the readable memory in a nonvolatile memory as a collision history.

Therefore, even when the airbag system stops and the process of storing acceleration data in the nonvolatile memory is finished imperfectly because of a cutoff of the power supply during the storing process or for any other reason, the airbag system can store acceleration data on acceleration that the vehicle undergoes during a predetermined time period immediately before and/or before the determined inflation time, which shows a strong correlation with the inflation of the airbag, thereby improving the accuracy of the analysis of the collision.

Further objects and advantages of the present invention will be apparent from the following description of the preferred embodiments of the invention as illustrated in the accompanying drawings.

DETAILED DESCRIPTION OF THE PREFERRED EMBODIMENTS

Figure 11:
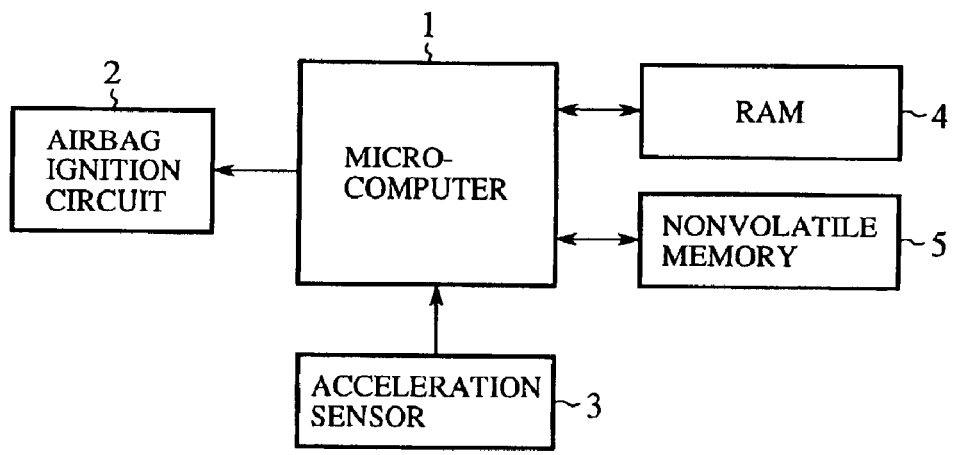
FIG. 11 is a block diagram showing the structure of a general prior art airbag system.
Figure 12:
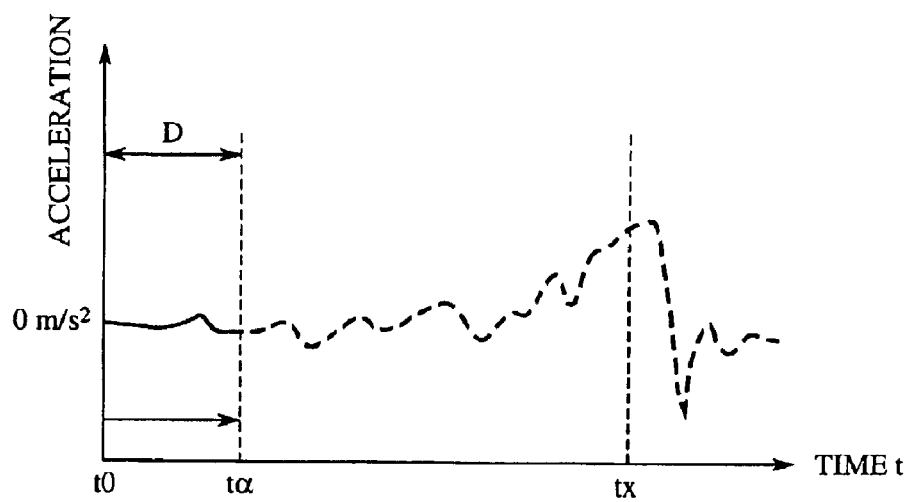
FIG. 12 is a graph showing acceleration data that are stored in a volatile memory by the prior art airbag system of FIG. 11.

The invention will now be described with reference to the accompanying drawings. A storage unit of an airbag system according to the present invention has the same structure as that of the prior art airbag system as shown in FIG. 11, and FIG. 11 is referred to in the following explanation.

When an airbag is inflated, the prior art airbag system stores acceleration data stored in a RAM 4 in a nonvolatile memory 5 in chronological order, as mentioned above. In contrast, the airbag system according to the present invention reads acceleration data on acceleration that a vehicle undergoes during a predetermined time period before the inflation time when the airbag is inflated and acceleration data on acceleration that the vehicle undergoes during a predetermined time period after the inflation time from the RAM 4 and stores them in the nonvolatile memory 5 as a collision history.

Embodiment 1.

Figure 6:
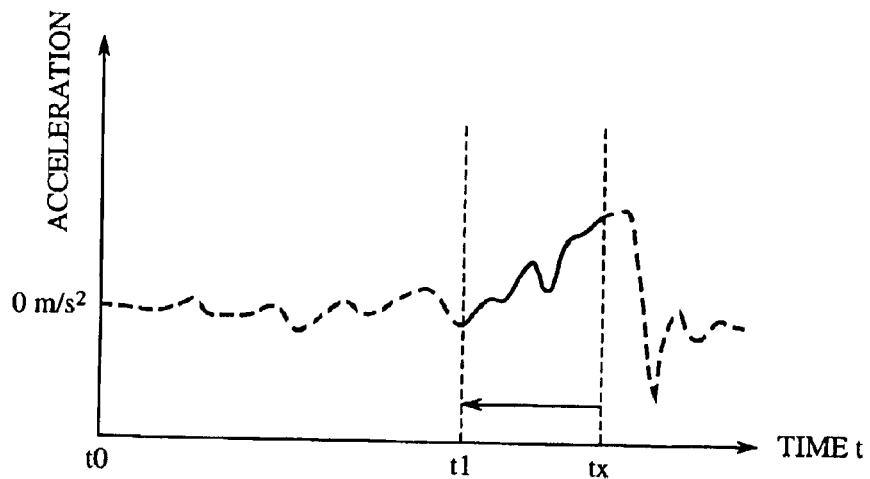
FIG. 6 is a graph showing acceleration data that are stored in a nonvolatile memory by the airbag system according to embodiment 1 of the present invention.

An airbag system according to embodiment 1 of the present invention is so constructed as to write acceleration data on acceleration that a vehicle undergoes during a predetermined time period immediately before an inflation time tx when an airbag is inflated, the acceleration being detected by an acceleration sensor 3, in non-chronological order in a nonvolatile memory 5. In the case of acceleration data of FIG. 6, the airbag system writes acceleration data on acceleration that the vehicle undergoes during a predetermined time period from the inflation time tx to a certain collision history start time t1 (which can be arbitrarily set so that it is within a time period showing a strong correlation with the inflation of the airbag) in the nonvolatile memory 5 so that the acceleration data are stored in non-chronological order, i.e., in the order of tx→t1.

Figure 1:
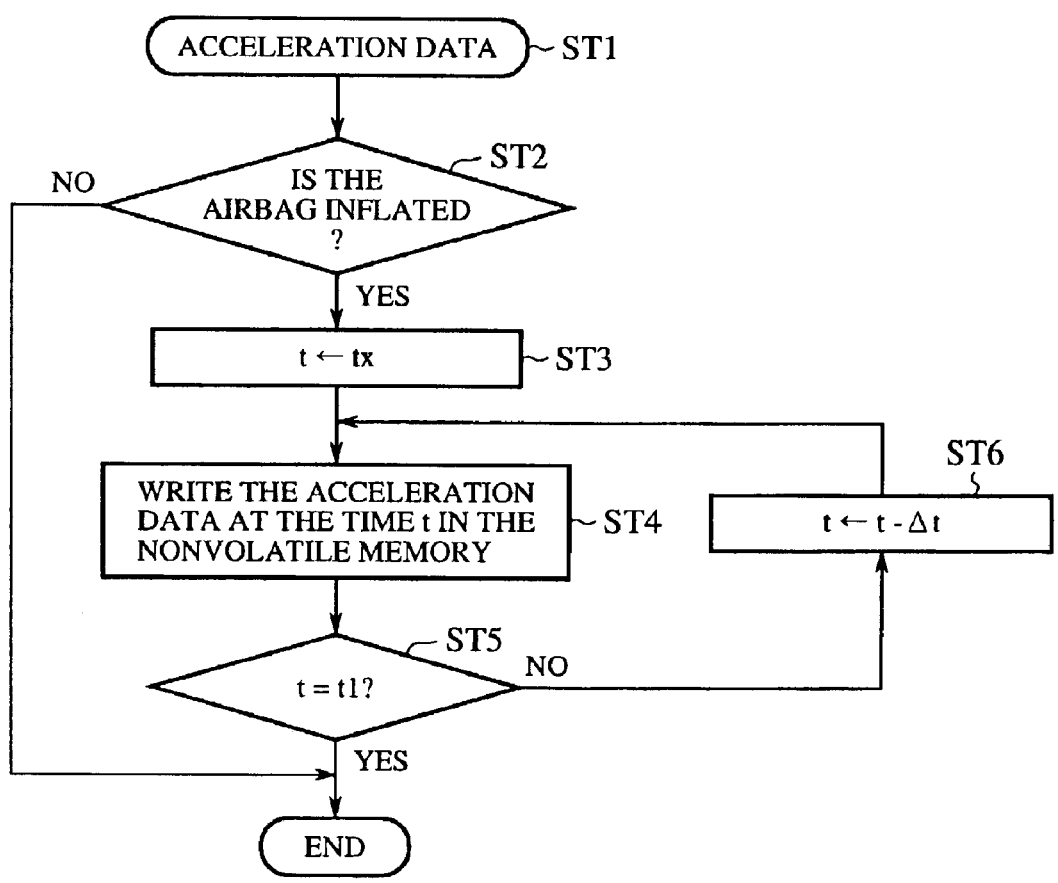
FIG. 1 is a flow chart showing an operation of an airbag system according to embodiment 1 of the present invention.

FIG. 1 is a flow chart showing an operation of the airbag system according to embodiment 1 of the present invention. The airbag system writes acceleration data in a RAM 4 while the vehicle is moving (in step ST1). A microcomputer 1 of the airbag system determines whether or not the vehicle is involved in a collision and the airbag is then inflated (in step ST2). When determining that the airbag is inflated, the microcomputer 1 determines the inflation time tx and assigns the inflation time tx to a variable time t (in step ST3). The microcomputer 1 then writes the acceleration data at the time t in the nonvolatile memory 5 (in step ST4). The microcomputer 1 further determines whether or not the time variable t is equal to the collision history start time t1 (in step ST5). When the determination result shows No, that is, when the variable time t is not equal to the collision history start time t1, the microcomputer 1 substitutes (t−Δt) (Δt is a sampling time) into the variable time t (in step ST6). The microcomputer 1 then repeats steps ST4 to ST6 until the variable time t becomes equal to the collision history start time t1. On the other hand, when the determination result of step ST5 shows Yes, that is, when the variable time t becomes equal to the collision history start time t1, the microcomputer 1 finishes the writing process.

In accordance with this embodiment 1, even when the airbag system stops and the process of storing acceleration data in the nonvolatile memory is finished imperfectly because of a cutoff of the power supply during the storing process or for any other reason, there is a high possibility that the airbag system normally stores acceleration data on acceleration that the vehicle undergoes during a predetermined time period immediately before the inflation time tx, which shows a strong correlation with the inflation of the airbag, thereby improving the accuracy of the analysis of the collision.

Embodiment 2.

Figure 7:
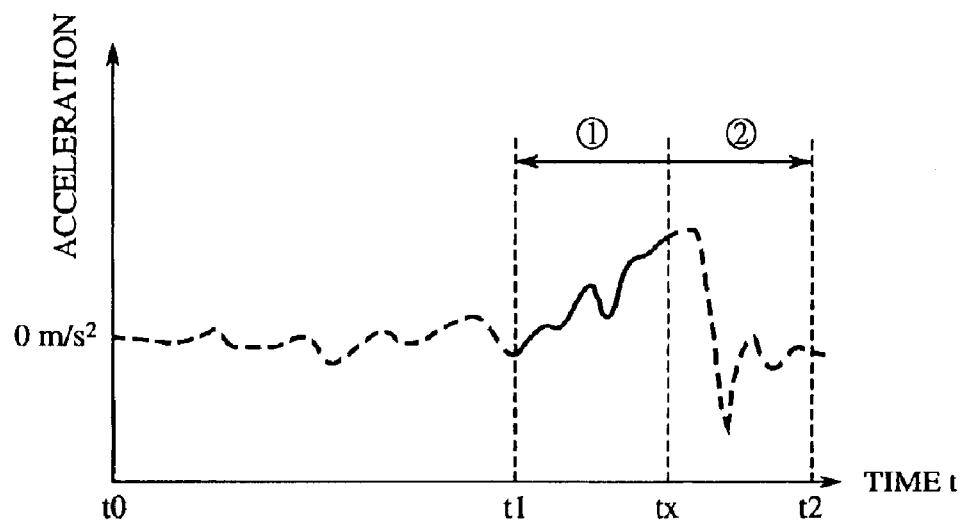
FIG. 7 is a graph showing acceleration data that are stored in a nonvolatile memory by the airbag system according to embodiment 2 of the present invention.

An airbag system according to embodiment 2 of the present invention is so constructed as to write both acceleration data on acceleration that a vehicle undergoes during a predetermined time period immediately before an inflation time tx when an airbag is inflated and acceleration data on acceleration that the vehicle undergoes during a predetermined time period immediately after the inflation time tx in a nonvolatile memory 5, the acceleration being detected by an acceleration sensor 3. In the case of acceleration data shown in FIG. 7, the airbag system writes acceleration data on acceleration that the vehicle undergoes during a predetermined time period from a certain collision history start time t1 immediately before the inflation time tx when the airbag is inflated to a collision history end time t2 immediately after the inflation time tx in the nonvolatile memory 5 in the order of ① tx→t1 and ② tx→t2 so that the acceleration data associated with ① tx→t1 are stored in non-chronological order and the acceleration data associated with ② tx→t2 are then stored in chronological order.

Figure 2:
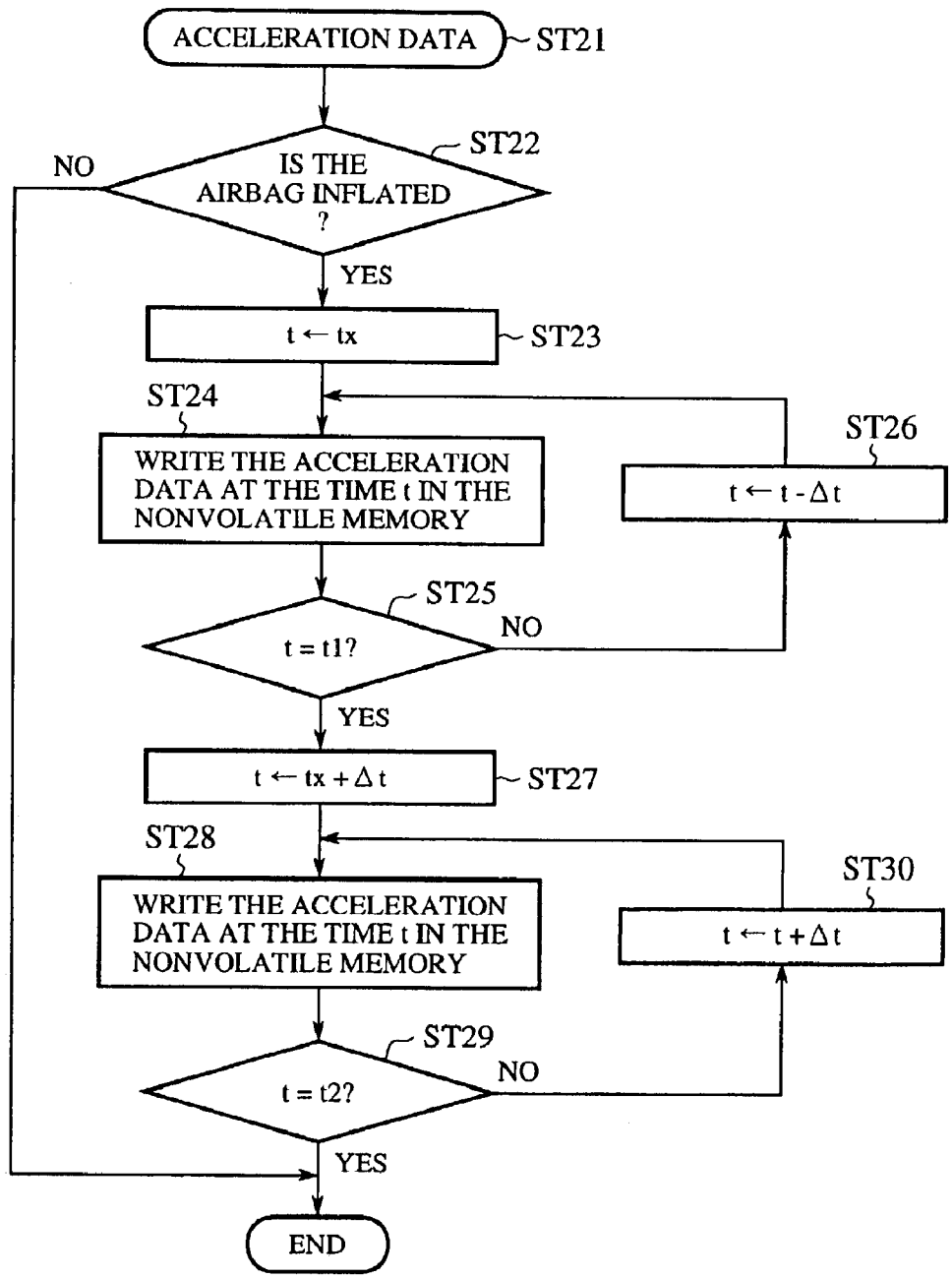
FIG. 2 is a flow chart showing an operation of an airbag system according to embodiment 2 of the present invention.

FIG. 2 is a flow chart showing an operation of the airbag system according to embodiment 2 of the present invention. Steps ST21 to ST26 are the same as steps ST1 to ST6 of above-mentioned embodiment 1. The airbag system writes acceleration data on acceleration that the vehicle undergoes after the inflation time tx in the nonvolatile memory 5 in steps ST27 to ST30. In other words, a microcomputer 1 calculates and substitutes (tx+Δt) into a variable time t in step ST27. The microcomputer 1 then writes the acceleration data at the time t in the nonvolatile memory 5 (in step ST28). The microcomputer 1 determines whether or not the variable time t is equal to the collision history end time t2 (in step ST29). If the variable time t is not equal to the collision history end time t2, the microcomputer 1 substitutes (t+Δt) into the variable time t (in step ST30), and then repeats steps ST28 to ST30 until the variable time t becomes equal to the collision history end time t2. When the determination result of step ST29 shows Yes, that is, when the variable time t becomes equal to the collision history end time t2, the microcomputer 1 finishes the writing process.

In accordance with this embodiment 2, even when the airbag system stops and the process of storing acceleration data in the nonvolatile memory is finished imperfectly because of a cutoff of the power supply during the storing process or for any other reason, there is a high possibility that the airbag system normally stores acceleration data on acceleration that the vehicle undergoes during a predetermined time period immediately before the inflation time tx, a predetermined time period after the collision history start time t1, a predetermined time period immediately after the inflation time tx, and a predetermined time period before the collision history end time t2 in decreasing order of correlation with the inflation of the airbag, i.e., in the order of the predetermined time period immediately before the inflation time tx, the predetermined time period after the collision history start time t1, the predetermined time period immediately after the inflation time tx, and the predetermined time period before the collision history end time t2, thereby improving the accuracy of the analysis of the collision.

Embodiment 3.

An airbag system according to embodiment 3 of the present invention is so constructed as to write acceleration data on acceleration that a vehicle undergoes during predetermined time periods immediately before and after an inflation time tx when an airbag is inflated, acceleration data on acceleration that the vehicle undergoes during a predetermined time period after a collision history start time and acceleration data on acceleration that the vehicle undergoes during a predetermined time period before a collision history end time in a nonvolatile memory 5, the acceleration being detected by an acceleration sensor 3.

Figure 8:
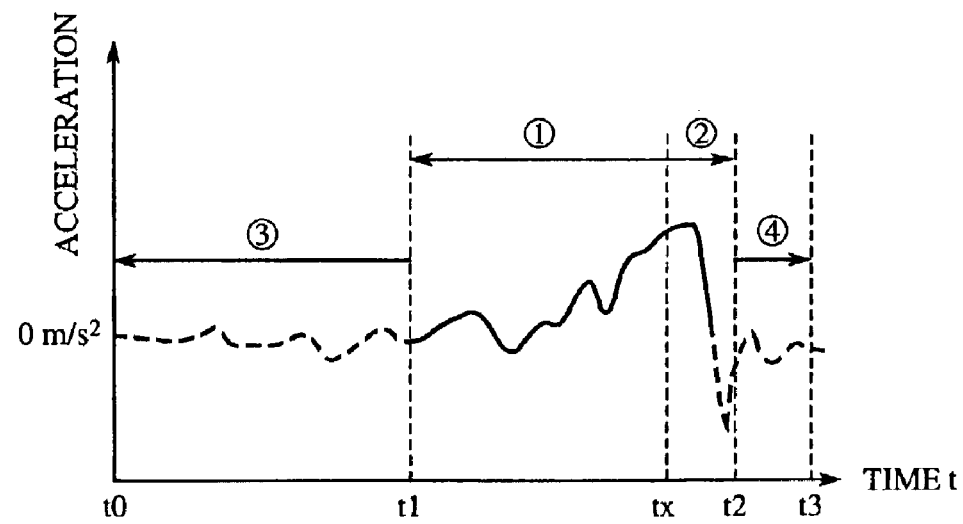
FIG. 8 is a graph showing acceleration data that are stored in a nonvolatile memory by the airbag system according to embodiment 3 of the present invention.

In the case of acceleration data shown in FIG. 8, the airbag system writes acceleration data on acceleration that the vehicle undergoes during a predetermined time period from a first collision history start time t1 immediately before the inflation time tx when the airbag is inflated to a first collision history end time t2 immediately after the inflation time tx in the nonvolatile memory 5 in the order of ① tx→t1 and ② tx→t2 so that the acceleration data associated with ① tx→t1 are stored in non-chronological order and the acceleration data associated with ② tx→t2 are then stored in chronological order. The airbag system further writes acceleration data on acceleration that the vehicle undergoes during a predetermined time period from the first collision history start time t1 to a second collision history start time t0 and acceleration data on acceleration that the vehicle undergoes during a predetermined time period from the first collision history end time t1 to a second collision history end time t3 in the order of ③ t1→t0 and ④ t2→t3 so that the acceleration data on ③ t1→t0 are stored in non-chronological order and the acceleration data on ④ t2→t3 are then stored in chronological order.

Figure 3:
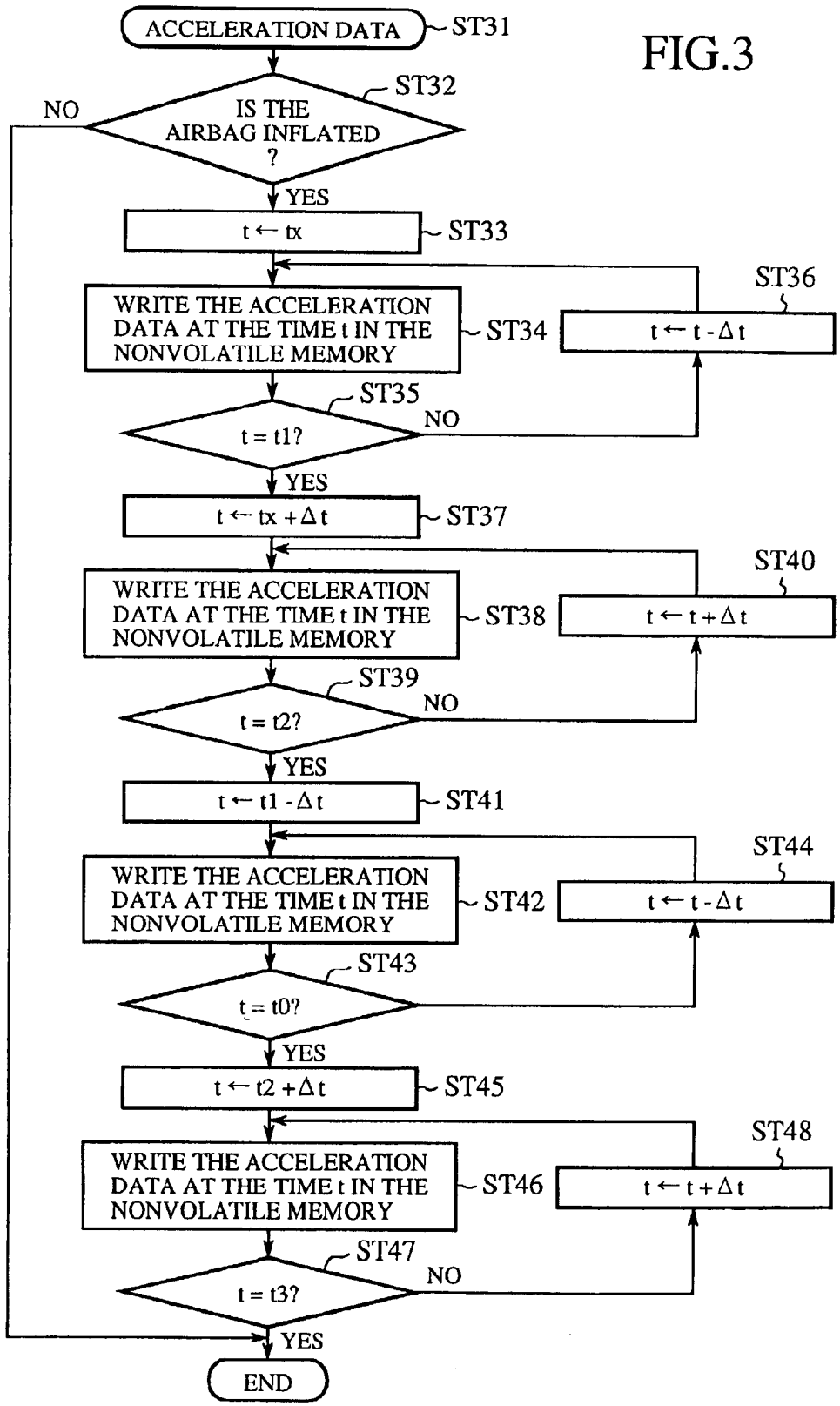
FIG. 3 is a flow chart showing an operation of an airbag system according to embodiment 3 of the present invention.

FIG. 3 is a flow chart showing an operation of the airbag system according to embodiment 3. Steps ST31 to ST40 are the same as steps ST21 to ST30 of above-mentioned embodiment 2. The microcomputer 1 calculates and substitutes (t1−Δt) into a variable time t in step ST41. The microcomputer 1 then writes the acceleration data at the time t in the nonvolatile memory 5 (in step ST42). The microcomputer 1 determines whether or not the variable time t is equal to the second collision history start time t0 (in step ST43). If the variable time t is not equal to the second collision history start time t0, the microcomputer 1 substitutes (t−Δt) into the variable time t (in step ST44), and then repeats steps ST42 to ST44 until the variable time t becomes equal to the second collision history start time t0. As a result, the microcomputer 1 writes the acceleration data on acceleration that the vehicle undergoes during a predetermined time period from the second collision history start time t0 to the first collision history start time t1 in the nonvolatile memory 5 so that they are stored in non-chronological order.

The microcomputer 1 then calculates and substitutes (t2+Δt) into the variable time t (in step ST45). The microcomputer 1 writes the acceleration data at the time t in the nonvolatile memory 5 (in step ST46). The microcomputer 1 determines whether or not the variable time t is equal to the second collision history end time t3 (in step ST47). If the variable time t is not equal to the second collision history end time t3, the microcomputer 1 substitutes (t+Δt) into the variable time t (in step ST48), and then repeats steps ST46 to ST48 until the variable time t becomes equal to the second collision history end time t3. When the determination result of step ST47 shows Yes, that is, when the variable time t becomes equal to the second collision history end time t3, the microcomputer 1 finishes the writing process.

In accordance with this embodiment 3, the airbag system can store acceleration data on acceleration that the vehicle undergoes during two predetermined time periods immediately before and after the inflation time tx, which show a strong correlation with the inflation of the airbag. If no cutoff of the power supply occurs when the airbag is inflated, the airbag system can also acquire acceleration data on acceleration that the vehicle undergoes during a predetermined time period from the second collision history start time t0 to the first collision history start time t1 and acceleration data on acceleration that the vehicle undergoes during a predetermined time period from the first collision history end time t2 to the second collision history end time t3 in that order. Therefore, there is a high possibility that the acceleration data on acceleration that the vehicle undergoes during the predetermined time period from the second collision history start time t0 to the first collision history start time t1 can be stored in the nonvolatile memory 5 even if a cutoff of the power supply occurs while the storing process is carried out and the acceleration data are effectively used for the analysis of the collision. When the acceleration data on acceleration that the vehicle undergoes during the predetermined time period from the first collision history end time t2 to the second collision history end time t3 are normally stored in the nonvolatile memory 5, the acceleration data are also effectively used for the analysis of the collision together with the above-mentioned acceleration data on acceleration that the vehicle undergoes during the predetermined time period from the second collision history start time t0 to the first collision history start time t1.

In accordance with this embodiment 3, even when the airbag system stops and the process of storing acceleration data in the nonvolatile memory is finished imperfectly because of a cutoff of the power supply during the storing process or for any other reason, there is a high possibility that the airbag system normally stores acceleration data on acceleration that the vehicle undergoes during a predetermined time period immediately before the inflation time tx, a predetermined time period immediately after the inflation time tx, a predetermined time period after the collision history start time t1, and a predetermined time period before the collision history end time t2 in decreasing order of correlation with the inflation of the airbag, i.e., in the order of the predetermined time period immediately before the inflation time tx, the predetermined time period immediately after the inflation time tx, the predetermined time period after the collision history start time t1, and the predetermined time period before the collision history end time t2, thereby improving the accuracy of the analysis of the collision.

Embodiment 4.

Figure 9:
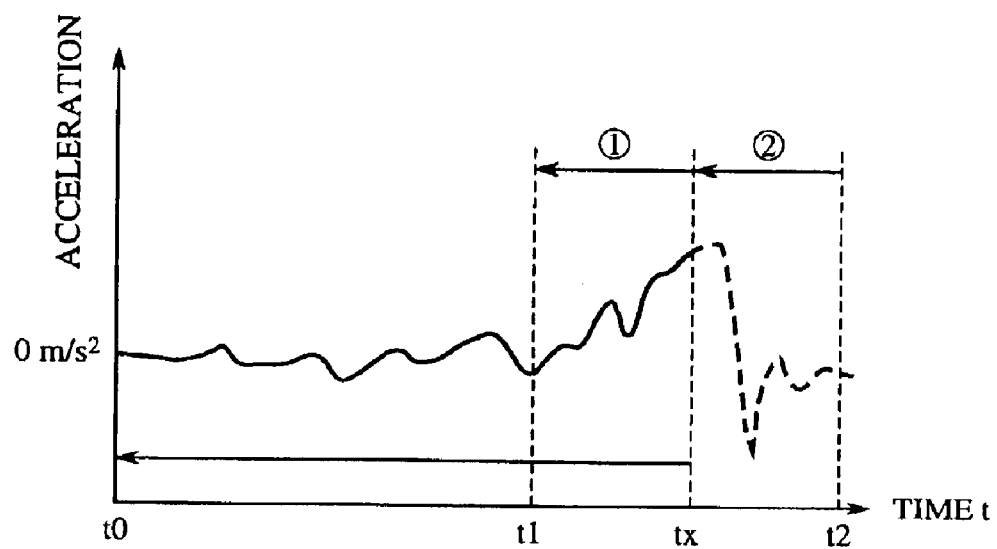
FIG. 9 is a graph showing acceleration data that are stored in a nonvolatile memory by the airbag system according to embodiment 4 of the present invention.

An airbag system according to embodiment 4 of the present invention is so constructed as to write acceleration data on acceleration that a vehicle undergoes during predetermined time periods immediately before and after an inflation time tx when an airbag is inflated in a nonvolatile memory 5, the acceleration being detected by an acceleration sensor 3. The airbag system according to this embodiment 4 differs from that according to embodiment 2 in that the airbag system writes acceleration data on acceleration that the vehicle undergoes during the predetermined time period immediately after the inflation time tx in non-chronological order. In the case of acceleration data shown in FIG. 9, the airbag system writes acceleration data on acceleration that the vehicle undergoes during a predetermined time period from a collision history start time t1 before the inflation time tx when the airbag is inflated to a collision history end time t2 after the inflation time tx in the nonvolatile memory 5 in the order of tx→t1 and t2→tx so that the acceleration data associated with tx→t1 are stored in non-chronological order and the acceleration data associated with t2→tx are then stored in non-chronological order.

Figure 4:
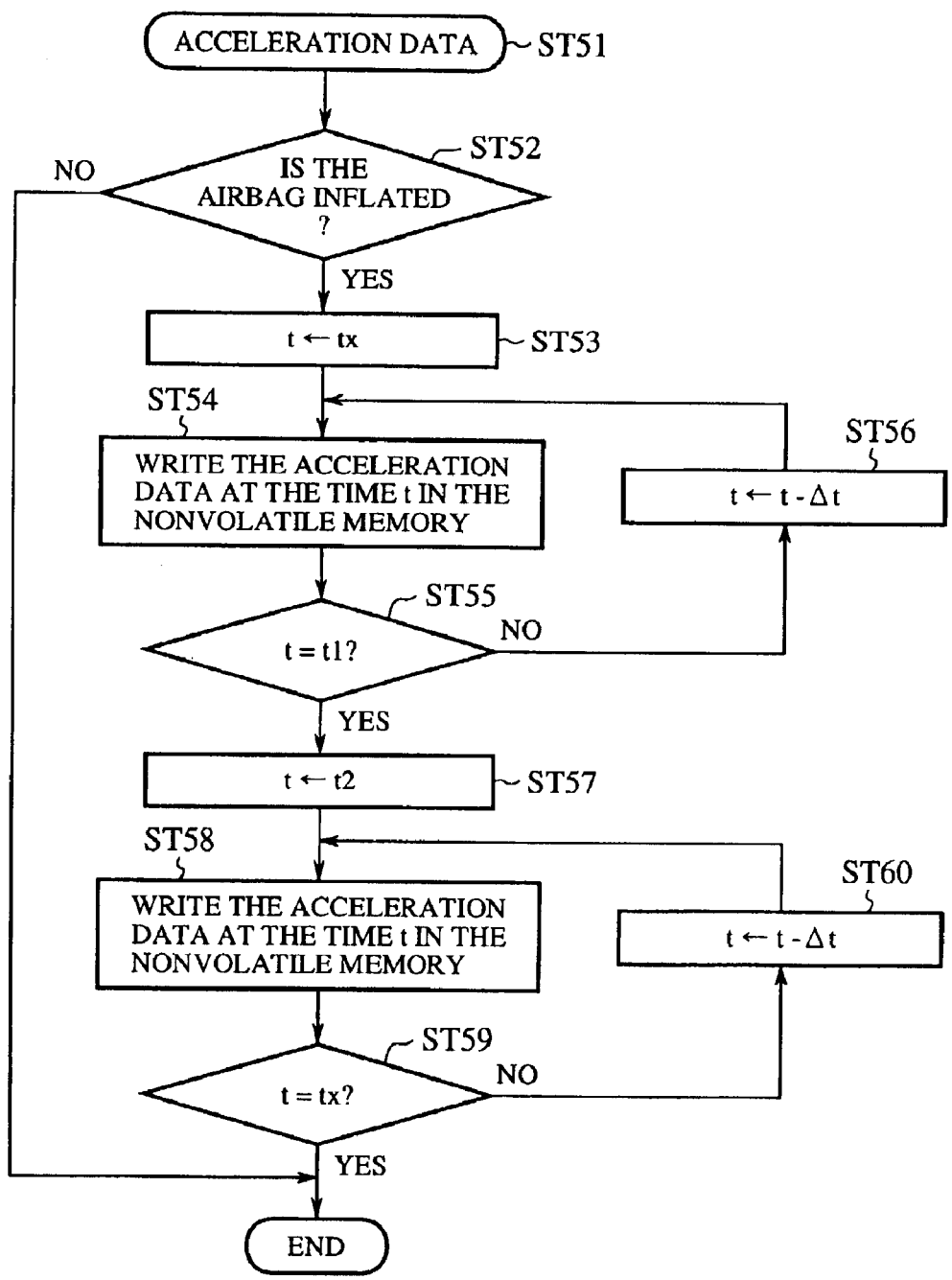
FIG. 4 is a flow chart showing an operation of an airbag system according to embodiment 4 of the present invention.

FIG. 4 is a flow chart showing an operation of the airbag system according to embodiment 4 of the present invention. Steps ST51 to ST56 are the same as steps ST1 (or ST21) to ST6 (or ST26) of above-mentioned embodiment 1 (or 2). A microcomputer 1 processes the acceleration data on acceleration that the vehicle undergoes after the inflation time tx in steps ST57 to ST60. The microcomputer 1 then determines and substitutes the collision history end time t2 into a variable time t in step ST57. The microcomputer 1 writes the acceleration data at the time t in the nonvolatile memory 5 (in step ST58). The microcomputer 1 determines whether or not the variable time t is equal to the inflation time tx (in step ST59). If the variable time t is not equal to the inflation time tx, the microcomputer 1 substitutes (t−Δt) into the variable time t (in step ST60), and then repeats steps ST58 to ST60 until the variable time t becomes equal to the inflation time tx. When the determination result of step ST59 shows Yes, that is, when the variable time t becomes equal to the inflation time tx, the microcomputer 1 finishes the writing process.

In accordance with this embodiment 4, even when the airbag system stops and the process of storing acceleration data in the nonvolatile memory is finished imperfectly because of a cutoff of the power supply during the storing process or for any other reason, there is a high possibility that the airbag system normally stores acceleration data on acceleration that the vehicle undergoes during a predetermined time period immediately before the inflation time tx, a predetermined time period after the collision history start time t1, a predetermined time period before the collision history end time t2, and a predetermined time period immediately after the inflation time tx in the order of the predetermined time period immediately before the inflation time tx, the predetermined time period after the collision history start time t1, the predetermined time period before the collision history end time t2, and the predetermined time period immediately after the inflation time tx, thereby improving the accuracy of the analysis of the collision.

Embodiment 5.

Figure 10:
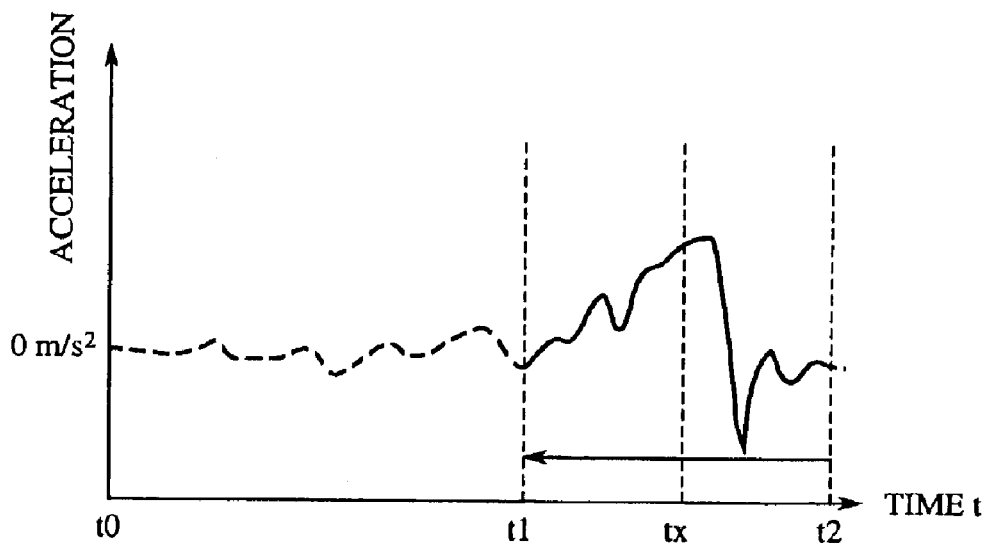
FIG. 10 is a graph showing acceleration data that are stored in a nonvolatile memory by the airbag system according to embodiment 5 of the present invention.

An airbag system according to embodiment 5 of the present invention is so constructed as to write acceleration data on acceleration that a vehicle undergoes during a predetermined time period from a collision history start time t1 before an inflation time tx when an airbag is inflated to a collision end time t2 after the inflation time tx, the acceleration being detected by an acceleration sensor 3, in a nonvolatile memory 5 so that the acceleration data are stored in non-chronological order. In the case of acceleration data shown in FIG. 10, the airbag system writes acceleration data on acceleration that the vehicle undergoes during the predetermined time period from the collision history start time t1 before the inflation time tx to the collision history end time t2 after the inflation time tx in the nonvolatile memory 5 so that the acceleration data are stored in non-chronological order, i.e., in the order of t2→t1.

Figure 5:
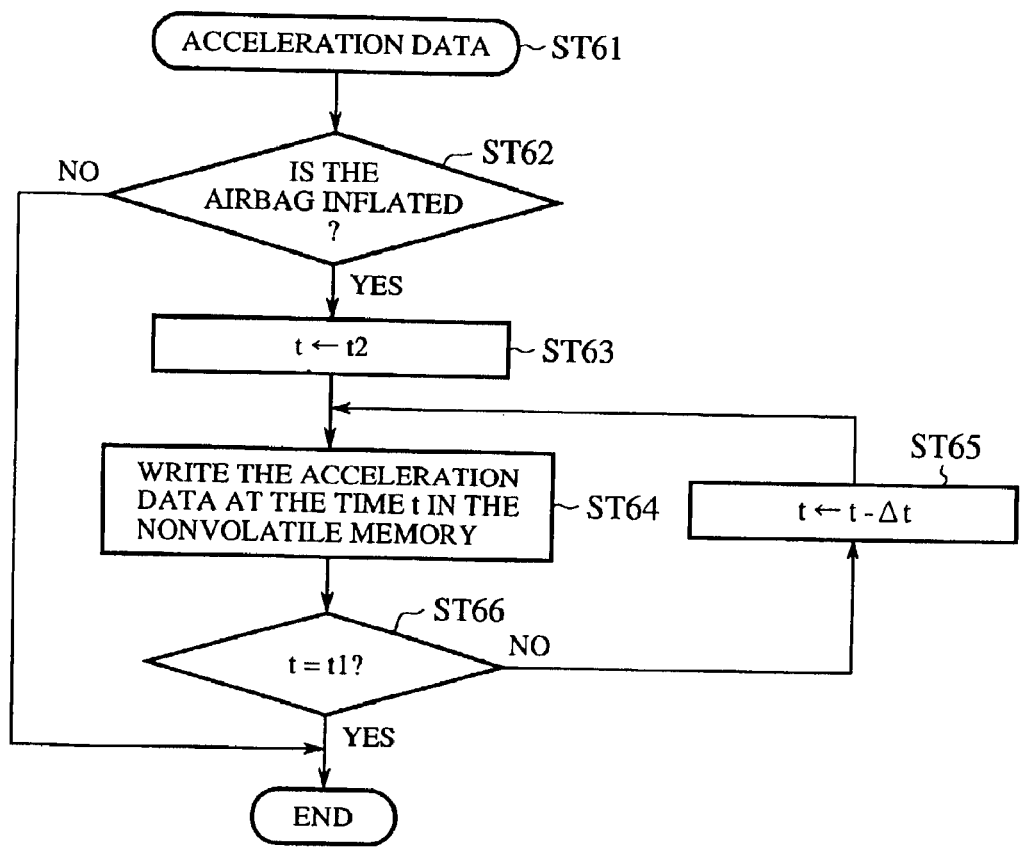
FIG. 5 is a flow chart showing an operation of an airbag system according to embodiment 5 of the present invention.

FIG. 5 is a flow chart showing an operation of the airbag system according to embodiment 5 of the present invention. A microcomputer 1 determines whether or not the airbag is inflated based on the acceleration data (in steps ST61 and ST62). The microcomputer 1 then determines and substitutes the collision history end time t2 into a variable time t (in step ST63). The microcomputer 1 writes the acceleration data at the time t in the nonvolatile memory 5 (in step ST64). The microcomputer 1 determines whether or not the variable time t is equal to the collision history start time t1 (in step ST66). If the variable time t is not equal to the collision history start time t1, the microcomputer 1 substitutes (t−Δt) into the variable time t (in step ST65), and then repeats steps ST64 to ST66 until the variable time t becomes equal to the collision history start time t1. When the determination result of step ST66 shows Yes, that is, when the variable time t becomes equal to the collision history start time t1, the microcomputer 1 finishes the writing process.

In accordance with this embodiment 5, even when the airbag system stops and the process of storing acceleration data in the nonvolatile memory is finished imperfectly because of a cutoff of the power supply during the storing process or for any other reason, there is a high possibility that the airbag system normally stores acceleration data on acceleration that the vehicle undergoes during a predetermined time period before the collision history end time t2, a predetermined time period immediately after the inflation time tx, a predetermined time period immediately before the inflation time tx, and a predetermined time period after the collision history start time t1 in the order of the predetermined time period before the collision history end time t2, the predetermined time period immediately after the inflation time tx, the predetermined time period immediately before the inflation time tx, and the predetermined time period after the collision history start time t1, thereby improving the accuracy of the analysis of the collision.

Many widely different embodiments of the present invention may be constructed without departing from the spirit and scope of the present invention. It should be understood that the present invention is not limited to the specific embodiments described in the specification, except as defined in the appended claims.

What is claimed is:

1. An airbag system collision history recording method, comprising inflating an airbag based on acceleration data indicating that a vehicle is in a collision;

writing the acceleration data in a readable memory;

determining an inflation time when said airbag is inflated;

reading a first portion of the acceleration data corresponding to a first predetermined time period before said inflation time; and storing the first portion of the acceleration data in a nonvolatile memory, in a reverse chronological order starting from the inflation time, as a collision history.

2. The method according to claim 1, wherein the first predetermined time period extends from a collision start time to said inflation time.

3. The method according to claim 1, further comprising:
reading a second portion of the acceleration data corresponding to a second predetermined time period after said inflation time; and
storing the second portion of the acceleration data in a nonvolatile memory, in a chronological order starting from the inflation time, as a second part of the collision history.

4. The method according to claim 3, wherein the first portion of the acceleration data is stored in the nonvolatile memory before the second portion of the acceleration data.

5. The method according to claim 3, wherein the first predetermined time period extends from a collision start time to said inflation time, and the second predetermined time period extends from said inflation time to a collision end time.

6. The method according to claim 1, further comprising:
reading a second portion of the acceleration data corresponding to a second predetermined time period after said inflation time;
reading a third portion of the acceleration data corresponding to a third predetermined time period before said first predetermined time period;
reading a fourth portion of the acceleration data corresponding to a fourth predetermined time period after said second predetermined time period;
storing the second portion of the acceleration data in a nonvolatile memory, in a chronological order starting from the inflation time, as a second part of the collision history;
storing the third portion of the acceleration data in the nonvolatile memory, in a reverse chronological order starting from an end point of the first portion, as a third part of the collision history; and
storing the fourth portion of the acceleration data in the nonvolatile memory, in a chronological order starting from an end point of the second portion, as a fourth part of the collision history.

7. The method according to claim 6, wherein:
the first portion of the acceleration data is stored in the nonvolatile memory before the second portion of the acceleration data;
the second portion of the acceleration data is stored in the nonvolatile memory before the third portion of the acceleration data; and
the third portion of the acceleration data is stored in the nonvolatile memory before the fourth portion of the acceleration data.

8. The method according to claim 6, wherein the first predetermined time period extends from a collision start time to said inflation time, the second predetermined time period extends from said inflation time to a collision end time; the third predetermined time period extends from said collision start time to a data recording start time, and the fourth predetermined time period extends from said collision end time to a second collision end time.

9. The method according to claim 1, further comprising:
reading a second portion of the acceleration data corresponding to a second predetermined time period after said inflation time; and
storing the second portion of the acceleration data in a nonvolatile memory, in a reverse chronological order starting from a collision end time, as a second part of the collision history.

10. The method according to claim 9, wherein the first portion of the acceleration data is stored in the nonvolatile memory before the second portion of the acceleration data.

11. The method according to claim 9, wherein the second portion of the acceleration data is stored in the nonvolatile memory before the first portion of the acceleration data.

12. The method according to claim 9, wherein the first predetermined time period extends from a collision start time to said inflation time, and the second predetermined time period extends from said inflation time to a collision end time.

* * * * *